US011370195B2

United States Patent
Katsuya et al.

(10) Patent No.: US 11,370,195 B2
(45) Date of Patent: Jun. 28, 2022

(54) MULTILAYER COMPOSITE AND METHOD FOR PRODUCING SAME

(71) Applicant: KURARAY CO., LTD., Kurashiki (JP)

(72) Inventors: Satoshi Katsuya, Kurashiki (JP); Yosuke Washitake, Kurashiki (JP); Ryokei Endo, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 112 days.

(21) Appl. No.: 16/661,044

(22) Filed: Oct. 23, 2019

(65) Prior Publication Data

US 2020/0055276 A1    Feb. 20, 2020

Related U.S. Application Data

(63) Continuation of application No. PCT/JP2018/016612, filed on Apr. 24, 2018.

(30) Foreign Application Priority Data

Apr. 28, 2017 (JP) .............................. JP2017-089988

(51) Int. Cl.
 *B32B 5/26* (2006.01)
 *B32B 5/02* (2006.01)
 (Continued)

(52) U.S. Cl.
 CPC ................ *B32B 5/26* (2013.01); *B32B 5/022* (2013.01); *B32B 5/024* (2013.01); *D04H 1/55* (2013.01);
 (Continued)

(58) Field of Classification Search
 CPC ............ B64D 11/00; B32B 2307/3065; B32B 2307/7244; B32B 27/08; B32B 27/18;
 (Continued)

(56) References Cited

U.S. PATENT DOCUMENTS

| 4,438,166 A | 3/1984 | Gluck et al. |
| 5,316,834 A | 5/1994 | Matsuda et al. |

(Continued)

FOREIGN PATENT DOCUMENTS

| EP | 1 803 551 A1 | 7/2007 |
| EP | 3 095 807 A1 | 11/2016 |

(Continued)

OTHER PUBLICATIONS

Machine translation of JP 2015-085613A; Publication date: May 7, 2015; Inventor: Sasaki Hideaki.*

(Continued)

*Primary Examiner* — Vishal I Patel
(74) *Attorney, Agent, or Firm* — Oblon, McClelland, Maier & Neustadt, L.L.P.

(57) ABSTRACT

Provided is a multilayer composite that has flame retardancy and low smoking property as well as has high physical characteristics. The multilayer composite has a multilayer structure and includes at least one core layer and at least one skin layer, wherein the multilayer composite satisfies all the following conditions (A) to (D): (A) the core layer is a composite including discontinuous reinforcing fibers and a first thermoplastic resin, in which the discontinuous reinforcing fibers are randomly dispersed and bonded with the first thermoplastic resin at least at intersections of the discontinuous reinforcing fibers; (B) the skin layer is a composite including continuous reinforcing fibers and a second thermoplastic resin, in which the continuous reinforcing fibers are impregnated with the second thermoplastic resin; (C) each of the first and the second thermoplastic resins has a limiting oxygen index of 30 or higher; and (D) the first and the second thermoplastic resins are miscible with each other.

14 Claims, 1 Drawing Sheet

(51) Int. Cl.
  *D04H 1/55* (2012.01)
  *B61D 17/00* (2006.01)
  *B64C 1/00* (2006.01)

(52) U.S. Cl.
  CPC ... *B32B 2260/021* (2013.01); *B32B 2260/046* (2013.01); *B32B 2262/02* (2013.01); *B32B 2262/106* (2013.01); *B61D 17/00* (2013.01); *B64C 1/00* (2013.01); *B64C 2001/0072* (2013.01)

(58) Field of Classification Search
  CPC .......... B32B 5/024; B32B 5/26; B32B 27/20; B32B 2260/046; B32B 2307/546; B32B 2262/106; B32B 2260/021; B32B 5/022; B32B 37/14; B32B 2262/02; B32B 5/28; B64C 2001/0072; B64C 1/00; D04H 1/55; B61D 17/00
  See application file for complete search history.

(56) References Cited

U.S. PATENT DOCUMENTS

| | | | |
|---|---|---|---|
| 7,244,501 | B2 | 7/2007 | Raghavendran et al. |
| 7,682,697 | B2 | 3/2010 | Raghavendran et al. |
| 7,943,078 | B2 | 5/2011 | Sekido et al. |
| RE44,893 | E | 5/2014 | Raghavendran et al. |
| 2005/0215698 | A1 | 9/2005 | Raghavendran et al. |
| 2006/0240242 | A1 | 10/2006 | Raghavendran et al. |
| 2007/0182071 | A1 | 8/2007 | Sekido et al. |
| 2009/0117366 | A1 | 5/2009 | Honma |
| 2010/0021718 | A1* | 1/2010 | Vos ..................... B29C 65/48 428/315.9 |
| 2012/0065283 | A1 | 3/2012 | Adjei et al. |
| 2012/0232211 | A1 | 9/2012 | Vos et al. |
| 2013/0292076 | A1 | 11/2013 | Raghavendran et al. |
| 2015/0028491 | A1 | 1/2015 | Raghavendran et al. |
| 2015/0344664 | A1 | 12/2015 | Adjei et al. |
| 2016/0303824 | A1 | 10/2016 | Takebe et al. |
| 2016/0339669 | A1 | 11/2016 | Miyoshi et al. |
| 2017/0050395 | A1 | 2/2017 | Vos et al. |

FOREIGN PATENT DOCUMENTS

| | | | |
|---|---|---|---|
| JP | 59-148653 | A | 8/1984 |
| JP | 5-117411 | A | 5/1993 |
| JP | 6-238659 | A | 8/1994 |
| JP | 2005-232601 | A | 9/2005 |
| JP | 2007-530320 | A | 11/2007 |
| JP | 2011-241338 | A | 12/2011 |
| JP | 2011-255533 | A | 12/2011 |
| JP | 2013-49751 | A | 3/2013 |
| JP | 2013-198984 | A | 10/2013 |
| JP | 2014-503694 | A | 2/2014 |
| JP | 2015-85613 | A | 5/2015 |
| JP | 2017-052269 | | 3/2017 |
| WO | WO 2005/097879 | A2 | 10/2005 |
| WO | WO 2012/037225 | A2 | 3/2012 |
| WO | WO 2014/162873 | A1 | 10/2014 |

OTHER PUBLICATIONS

International Search Report dated Aug. 7, 2018 in PCT/JP2018/016612, filed on Apr. 24, 2018.
Brandrup, J, et al., Polymer Handbook, Fourth Edition, vol. 2, 1999, A John Wiley & Sons, Inc., Publication, pp. 675-714.
Extended European Search Report dated Dec. 3, 2020 in European Patent Application No. 18791292.8, 8 pages.
Combined Chinese Office Action and Search Report dated Jan. 6, 2021 in Patent Application No. 201880028094.X (with English machine translation), 13 pages.
Office Action dated Jun. 30, 2021 in corresponding Chinese Patent Application No. 201880028094.X (with English Translation), 8 pages.
Office Action dated Jul. 12, 2021 in corresponding European Patent Application No. 18 791 292.8; 4 pages.
Combined Taiwanese Office Action and Search Report dated Jul. 12, 2021 in corresponding Taiwanese Patent Application No. 107114411 (with English Translation), 11 pages.
Japanese Office Action dated Nov. 30, 2021 in Japanese Patent Application No. 2019-514532 (with unedited computer generated English translation), 9 pages.
Notification dated Feb. 8, 2022, and Offer of Information submitted Feb. 4, 2022, in corresponding Japanese Patent Application No. 2019-514532 (w/Machine English Translation).

* cited by examiner

CARBON FIBER

THERMOPLASTIC RESIN

MULTILAYER COMPOSITE AND METHOD FOR PRODUCING SAME

CROSS REFERENCE TO THE RELATED APPLICATION

This application is a continuation application, under 35 U.S.C § 111(a) of international application No. PCT/JP2018/016612, filed Apr. 24, 2018, which claims priority to Japanese patent application No. 2017-089988, filed Apr. 28, 2017, the entire disclosure of which is herein incorporated by reference as a part of this application.

FIELD OF THE INVENTION

The present invention relates to a multilayer composite and a method for producing the same.

BACKGROUND OF THE INVENTION

In the fields of automobiles, railway cars, aircrafts and ships, there has been a strong demand for reducing weights of components constituting a vehicle body in terms of fuel efficiency and environmental protection. In the field of aircrafts that particularly strongly demands weight reduction of components, sandwich materials have been employed for interior components in which the sandwich materials have a core layer of a honeycomb or foaming material and a skin layer of carbon-fiber-reinforced plastic, for example. However, production of such interior components requires a process of bonding the core layer and the skin layer, which leads to a problem of complicated production processes and reduced productivity.

With respect to the above problem, Patent Document 1 (JP Laid-open Patent Publication No. 2014-503694) proposes a composition for the manufacture of a porous article, the composition including reinforcing fibers, polyimide fibers, and polymeric binder fibers. Patent Document 1 describes that use of polyimide fibers makes it possible to obtain a base material having flame retardancy and low smoking property, and that heating of the base material makes the polyimide fibers, which are a thermoplastic resin, softened so that bending stress of the reinforcing fibers is released to cause the reinforcing fibers to expand, thereby making it possible to obtain a base material with lightweight and good form-moldability. Patent Document 1, however, has a problem that the base material does not have sufficient strength and modulus because it lacks overlay of a skin layer.

Patent Document 2 (JP Laid-open Patent Publication No. 2007-530320) proposes a sheet-like composite material including a porous core layer having an open cell structure formed by random crossing over of reinforcing fibers, and a skin layer, such as a flame-retardant film and a scrim. Patent Document 2 describes that provision of the skin layer enhances flame retardancy and low smoking property. Patent Document 2, however, has a problem that where a scrim and/or a film is used as a skin layer, the sheet-like composite material has poor integrity as a whole and thus cannot achieve sufficient strength and modulus.

SUMMARY OF THE INVENTION

Problems to be Solved by the Invention

Therefore, an object of the present invention is to provide a multilayer composite that is capable of solving the above problem, has flame retardancy and low smoking property, as well as has excellent integrity and high physical characteristics.

Another object of the present invention is to further provide a multilayer composite that is easily adjustable in shape and density by thermal expansion molding and is excellent in form-moldability.

Means for Solving the Problems

Accordingly, the present invention may include the following aspects.

Aspect 1

A multilayer composite having a multilayer structure and comprising at least one core layer and at least one skin layer, wherein the multilayer composite satisfies all the following conditions (A) to (D):

(A) the core layer is a composite including discontinuous reinforcing fibers and a first thermoplastic resin, in which the discontinuous reinforcing fibers are randomly dispersed and bonded with the first thermoplastic resin at least at intersections of the discontinuous reinforcing fibers;

(B) the skin layer is a composite including continuous reinforcing fibers and a second thermoplastic resin, in which the continuous reinforcing fibers are impregnated with the second thermoplastic resin;

(C) each of the first and the second thermoplastic resins has a limiting oxygen index of 30 or higher (preferably 32 or higher, and more preferably 35 or higher); and (D) the first and the second thermoplastic resins are miscible with each other.

Aspect 2

The multilayer composite according to aspect 1, wherein the continuous reinforcing fibers constituting the skin layer are carbon fibers.

Aspect 3

The multilayer composite according to aspect 1 or aspect 2, wherein each of the first and the second thermoplastic resins is at least one resin selected from the group consisting of a polyetherimide resin, a polyether ether ketone resin, a polyether ketone ketone resin, a polyethersulfone resin, a thermoplastic polyimide resin, a flame-retardant-containing polycarbonate resin, and a flame-retardant-containing polyester resin.

Aspect 4

The multilayer composite according to any one of aspects 1 to 3, wherein the first and the second thermoplastic resins are identical.

Aspect 5

The multilayer composite according to any one of aspects 1 to 4, wherein the multilayer composite has a void content in a range from 20 to 80% (preferably 25 to 80%, and more preferably 30 to 80%).

Aspect 6

The multilayer composite according to any one of aspects 1 to 5, wherein the core layer has a void content twice or more as high as that of the skin layer.

Aspect 7

The multilayer composite according to any one of aspects 1 to 4, wherein the discontinuous reinforcing fibers in the core layer have a bending shape and are used to expand the multilayer composite.

Aspect 8

A method for producing a multilayer composite as recited in any one of aspects 1 to 7, the method at least comprising:

overlaying at least one core layer material and at least one skin layer material to form a multilayer stack, and heat-compressing the multilayer stack and then cooling so as to integrate the multilayer stack, wherein in the formation of the multilayer stack, the core layer material is a nonwoven fabric that is formed of discontinuous reinforcing fibers and a first thermoplastic resin in a fibrous form and/or a particulate form, both the discontinuous reinforcing fibers and the first thermoplastic resin being randomly dispersed in the nonwoven fabric, the skin layer material is formed of a fabric made of continuous reinforcing fibers and a second thermoplastic resin to be impregnated in the fabric, in the integration of the multilayer stack, heating-compressing is carried out to mutually solubilize the first thermoplastic resin and the second thermoplastic resin and to bend the discontinuous reinforcing fibers.

Aspect 9

A method for producing a multilayer composite, comprising further heating a multilayer composite obtained after the integration as recited in aspect 8 to release bending stress of the discontinuous reinforcing fibers so as to expand the multilayer composite.

Aspect 10

A method for producing a multilayer composite, comprising heating the multilayer composite as recited in aspect 7 to expand the multilayer composite.

Aspect 11

The method according to aspect 9 or aspect 10, wherein in the expansion of the multilayer composite, the multilayer composite having a void content in a range from 0 to 20% (preferably 0 to 15%, and more preferably 0 to 10%) is heated such that the multilayer composite is expanded to have a higher void content after heating than the void content before heating.

Aspect 12

The method according to aspect 11, wherein the multilayer composite after heating has a void content in a range from 20 to 80%.

Aspect 13

The method according to any one of aspects 9 to 12, wherein the expansion is carried out through form-molding.

The present invention encompasses any combination of at least two features disclosed in the claims and/or the specification and/or the drawings. In particular, any combination of two or more of the appended claims should be equally construed as included within the scope of the present invention.

Effect of the Invention

According to the present invention, it is possible to obtain a multilayer composite having an excellent flame retardancy and low smoking property as well as having excellent integrity and high physical characteristics by combining the core layer and the skin layer. Furthermore, in a preferred aspect, it is possible to obtain a multilayer composite that is easily adjustable in shape and density through thermal expansion molding and is excellent in form-moldability.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
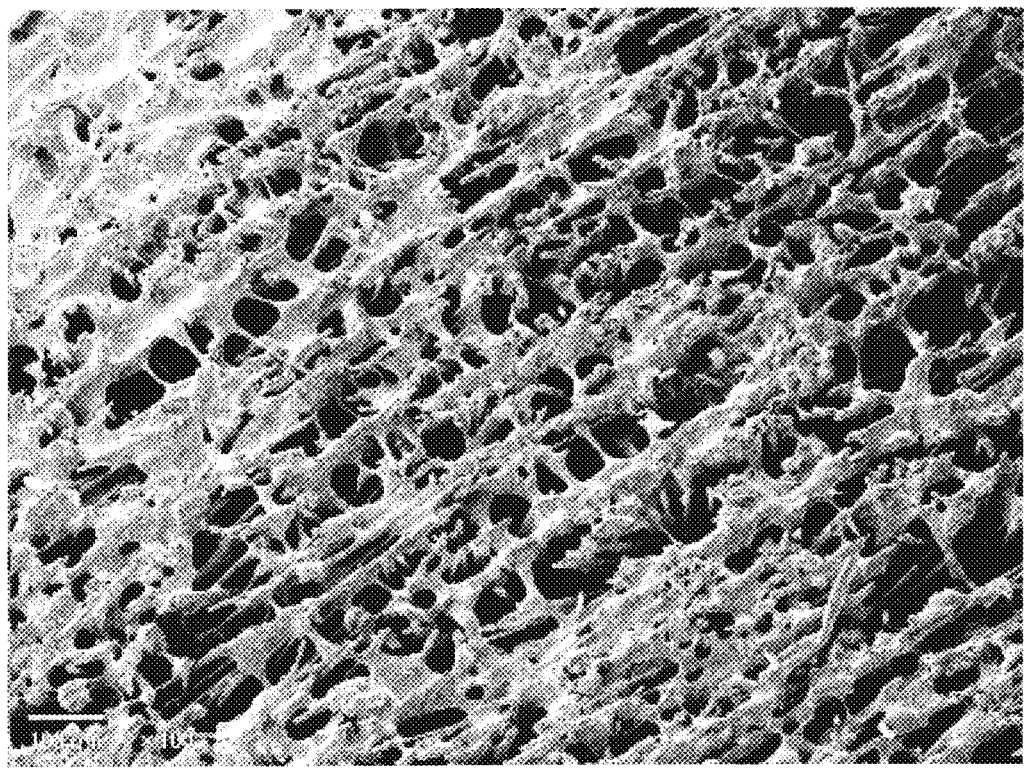
FIG. 1 is a SEM (Scanning Electron Microscope) image of a core layer in a multilayer composite prepared in Example 1.

Hereinafter, the multilayer composite according to the present invention will be further explained in detail.

It is of importance that a multilayer composite according to the present invention has a multilayer structure and includes at least one core layer and at least one skin layer, wherein the multilayer composite satisfies all the following conditions (A) to (D):

(A) the core layer is a composite including discontinuous reinforcing fibers and a first thermoplastic resin, in which the discontinuous reinforcing fibers are randomly dispersed and bonded with the first thermoplastic resin at least at intersections of the discontinuous reinforcing fibers;

(B) the skin layer is a composite including continuous reinforcing fibers and a second thermoplastic resin, in which the continuous reinforcing fibers are impregnated with the second thermoplastic resin;

(C) each of the first and the second thermoplastic resins has a limiting oxygen index (LOI) of 30 or higher; and (D) the first and the second thermoplastic resins are miscible with each other.

Core Layer

The core layer is a composite including discontinuous reinforcing fibers and a first thermoplastic resin, in which the discontinuous reinforcing fibers are randomly dispersed and bonded with the first thermoplastic resin at least at intersections of the discontinuous reinforcing fibers. For example, the core layer is formed as a composite having an open cell structure in which randomly-intersecting discontinuous reinforcing fibers are adhered with a thermoplastic resin in part or as a whole. As a core layer material, there may be mentioned a nonwoven fabric including discontinuous reinforcing fibers and a first thermoplastic resin in a fibrous form and/or a particulate form.

The discontinuous reinforcing fibers used for the core layer may include: metal fibers, such as aluminum fiber, brass fiber, and stainless-steel fiber; glass fibers; carbon fibers, such as polyacrylonitrile-based, rayon-based, lignin-based, or pitch-based carbon fiber and graphite fiber; and inorganic fibers, such as silicon carbide fiber, silicon nitride fiber, alumina fiber, silicon carbide fiber, and boron fiber. These fibers may be used singly or in combination of two or more of the fibers. Among these fibers, a carbon fiber may preferably be used as it can impart high flexural modulus and low specific gravity to a multilayer composite to be obtained.

The discontinuous reinforcing fibers have a fiber length of preferably 5 to 100 mm, more preferably 7 to 70 mm, and even more preferably 10 to 50 mm in order to enhance expansivity of the multilayer composite. Use of discontinuous reinforcing fibers having a fiber length that is too short may reduce a degree of expansion of the multilayer composite which is attributed to release of bending stress applied to the discontinuous reinforcing fibers in the core layer, making it impossible to reduce the density of the core layer. In contrast, use of discontinuous reinforcing fibers having a fiber length that is too long may deteriorate processability in a process of producing a nonwoven fabric by e.g. a wetlaid process, due to twisting and poor dispersion of the fibers.

For a first thermoplastic resin used in the core layer, it is important to have a limiting oxygen index (LOI) of 30 or higher, preferably 32 or higher, and more preferably 35 or higher. Use of a thermoplastic resin having an LOI that is too low may reduce flame retardancy of the multilayer composite. The first thermoplastic resin used for the core layer of the present invention may include, for example: a fluororesin, such as a polytetrafluoroethylene resin; a thermoplastic polyimide resin, such as a semi-aromatic polyimide resin, a polyamideimide resin, and a polyetherimide resin; a polysulfone resin, such as a polysulfone resin and a polyethersulfone resin; a semi-aromatic polyamide resin; a polyether ketone resin, such as a polyether ketone resin, a polyether ether ketone resin, and a polyether ketone ketone resin; a polycarbonate resin; a polyarylate resin; and a liquid crystal polyester resin, such as a wholly aromatic polyester resin. A flame retardant may be added to obtain a resin having an LOI that satisfies a predetermined range. Such a resin may include a general-purpose resin (for example, a polyester resin) containing a flame retardant.

As a flame retardant, there may be mentioned, for example: halogenated compounds (such as chlorine compounds and bromine compounds, specifically, polychioroparaffins, chlorinated paraffins, chlorinated polyethylenes, tetrabromoethane, and tetrabromobisphenol A); phosphate esters (for example, tricresyl phosphate, cresyl diphenyl phosphate, triphenyl phosphate, and trioctyl phosphate); halogen-containing phosphate esters (for example, tris(chloroethyl) phosphate, and bis(2,3-dibromopropyl)-2,3-dichloro-propyl phosphate); and inorganic compounds (such as antimony trioxide, aluminium hydroxide, and borates). These flame retardants may be used singly or in combination of two or more of the flame retardants.

Of these thermoplastic resins, it is preferable to use a polyetherimide resin, a polyether ether ketone resin, a polyether ketone ketone resin, a polyethersulfone resin, a polycarbonate resin (preferably, a flame-retardant-containing polycarbonate resin), and/or a flame-retardant-containing polyester resin. These thermoplastic resins may be used singly or as a mixture of two or more of the thermoplastic resins.

Where the first thermoplastic resin is used in a particulate form, the particles do not have to be made extremely small, however, where the particles have an extremely large diameter, the discontinuous reinforcing fibers and the particles may not be uniformly dispersed in the process of producing a nonwoven fabric, making it difficult to form a core layer having a homogeneous open cell structure. In one embodiment, the particles of the first thermoplastic resin may preferably have a particle diameter of 1.5 mm or smaller, and more preferably of 1.0 mm or smaller. The particle diameter does not specifically have a lower limit, but the lower limit may be, for example, about 0.01 mm.

Where the first thermoplastic resin is used in a fibrous form (hereinafter, referred to as thermoplastic fibers), the thermoplastic fibers may preferably have an average fineness from 0.1 to 10 dtex, more preferably from 0.2 to 9 dtex, and even more preferably from 0.3 to 8 dtex. In order to obtain a core layer having high expansivity, it is preferable to uniformly disperse the discontinuous reinforcing fibers and the thermoplastic fibers in a nonwoven fabric used for the core layer. As the thermoplastic fibers have a smaller average fineness, the number of the thermoplastic fibers constituting the nonwoven fabric increases, making it possible to disperse the reinforcing fibers more uniformly.

Where the average fineness is too small, however, the constituting fibers get easily entangled in the process of producing a nonwoven fabric, making it difficult to uniformly disperse the reinforcing fibers. In particular, where a nonwoven fabric is produced by a wetlaid process, fibers having an average fineness that is too small may degrade freeness during the process, significantly deteriorating processability. In contrast, where the average fineness is too large, the number of the thermoplastic fibers constituting the nonwoven fabric decreases, making it difficult to uniformly disperse the reinforcing fibers.

The thermoplastic fibers may preferably have an average fiber length from 0.5 to 60 mm. Where the average fiber length is too short, the fibers may fall off in the process of producing a nonwoven fabric. In particular, where a nonwoven fabric is produced by a wetlaid process, fibers having an average fiber length that is too short may significantly deteriorate processability due to e.g. degradation of freeness during the process. In contrast, where the average fiber length is too long, the constituting fibers get easily entangled in the process of producing a nonwoven fabric, making it difficult to uniformly disperse the reinforcing fibers. The average fiber length may preferably be from 1 to 55 mm, and more preferably from 3 to 50 mm.

Methods for producing the thermoplastic fibers are not specifically limited as long as the fiber shape can be obtained, and a known melt spinning apparatus may be used. That is, the thermoplastic fibers can be obtained by melt-kneading pellets and/or powder of a thermoplastic resin using a melt-extruder, directing the molten resin to a spinning cylinder and metering the molten resin with a gear pump to discharge from spinning nozzles, and then winding up filaments discharged from the spinning nozzles. The wind-up speed in this process is not specifically limited, but it is preferable to wind up the filaments at a speed in a range from 500 to 4000 m/min in order to reduce molecular orientation on spinning lines.

The core layer may contain resins other than the first thermoplastic resin (i.e., a thermoplastic resin having a limiting oxygen index (LOI) of 30 or higher) as necessary, as long as it does not deteriorate the flame retardancy and low smoking property of the multilayer composite. For example, the core layer material may contain discontinuous reinforcing fibers, a first thermoplastic resin in a fibrous form, and a polymer binder to bind these fibers. The polymer binder may be in a particulate, fibrous, or liquid form, but it is preferable to use a binder in fibrous form in order to form a nonwoven fabric. Use of binder fibers in combination with the thermoplastic fibers in the core layer makes it possible to enhance dispersibility of the thermoplastic fibers and the reinforcing fibers as well as to enhance adhesiveness of the discontinuous reinforcing fibers when a nonwoven fabric is used to form a multilayer composite.

The polymer binder is not specifically limited, and may include, for example, a polyolefin resin, a polyamide resin, a polyester resin, an acrylic resin, a polyvinyl alcohol resin, and a polyurethane resin. A polyester resin is preferably used.

The polyester resin may be formed of a polyester polymer containing a terephthalic acid component (a) and an isophthalic acid component (b), of dicarboxylic acid components, in a copolymerization ratio (molar ratio) of (a)/(b)=100/0 to 40/60 (preferably, 99/1 to 40/60). Use of such a polyester resin makes it possible to achieve good binder property as well as to reduce thermal decomposition during molding at high temperatures. The copolymerization ratio is more preferably (a)/(b)=90/10 to 45/55, and even more preferably (a)/(b)=85/15 to 50/50.

The polyester resin may also contain a small amount(s) of one or more of dicarboxylic acid components other than terephthalic acid and isophthalic acid in combination with these components, as long as the advantages of the present invention are not deteriorated.

As a diol component constituting the polyester resin, ethylene glycol may be used. One or more diol components other than ethylene glycol may be contained in a small amount(s) in combination with ethylene glycol.

Methods for producing a polyester resin consisting a polyester binder are not specifically limited, and a known method may be used. That is, a polyester binder may be produced, e.g., by a process of transesterifying a dicarboxylic acid component and a diol component as starting materials and then performing melt polymerization or by a process of directly esterifying a dicarboxylic acid and a diol component and then performing melt polymerization.

As a polymer binder, polyester binder fibers are particularly preferred. The polyester binder fibers may have, for example, a degree of crystallinity of 50% or lower, preferably 45% or lower, and even more preferably 40% or lower, in order to exhibit good binder performance. The degree of crystallinity can be adjusted to a desired value by changing a copolymerization ratio of the dicarboxylic acid components and/or a draw ratio in the process of fiberization (spinning). The polyester binder fibers may have a degree of crystallinity of 5% or higher in order to mold a multilayer composite.

Single fiber fineness of the polyester binder fibers is not particularly limited, and a wide variety of fibers having an average fineness, for example, from 0.1 to 50 dtex, and preferably from 0.5 to 20 dtex may be used.

An average fiber length of single fibers of the polyester binder fibers may suitably be set in accordance with desired strength of a multilayer composite. The average fiber length may be, for example, from 1 to 40 mm, preferably from 5 to 35 mm, and more preferably from 10 to 30 mm.

A ratio (weight ratio) of the first thermoplastic resin to the polymer binder (in particular, a polyester binder) in the core layer may be in a range of, for example, (former)/(latter)=60/40 to 100/0, preferably 70/30 to 99/1, and more preferably 80/20 to 98/2. It should be noted that the weight of the polymer binder means the weight of the solid content.

A ratio (weight ratio) of a total amount of the first thermoplastic resin and the discontinuous reinforcing fibers to the polymer binder (in particular, a polyester binder) in the core layer may be in a range of, for example, (former)/(latter)=85/15 to 100/0, preferably 88/12 to 99/1, and more preferably 90/10 to 98/2.

As a method for producing a nonwoven fabric to be used as the core layer material, a known process for producing a nonwoven fabric may be employed at least with the discontinuous reinforcing fibers and the first thermoplastic resin in a fibrous form and/or a particulate form. For example, a nonwoven fabric may be produced by a wetlaid process, an airlaid process, a dry mixing process, a carding and needle punching process, or any other known process used to produce a nonwoven fabric product, or a combination thereof. When producing a nonwoven fabric, the above-mentioned polymer binder may be used as necessary, in accordance with an ordinary method.

As a method for producing a core layer, the first thermoplastic resin in the nonwoven fabric may be heated using a heating device so as to soften the resin, and then the nonwoven fabric is cooled using a cooling device while being compressed so as to obtain a core layer having an open cell structure that is fixed by the first thermoplastic resin, with bending imparted to the discontinuous reinforcing fiber. Examples of such a heating device may include a hot-air heater, an infrared heater, a hot press machine, a belt press machine, and any other known processes used to heat resin products, and a combination thereof. Examples of such a compression cooling device may include nip rollers, calender rollers, a cold press machine, a belt press machine, and any other known processes used to cool resin products, and a combination thereof.

The discontinuous reinforcing fibers constituting the core layer of the present invention may preferably be present in a proportion from 20 to 90% by weight based on the total weight of the entire core layer, more preferably 30 to 85% by weight, and even more preferably 40 to 80% by weight. Where the proportion of the discontinuous reinforcing fibers is too small, such a small proportion of the discontinuous reinforcing fibers to the entire core layer would result in a reduced number of discontinuous reinforcing fibers with bending imparted thereto, possibly preventing the multilayer composite from expanding sufficiently. Also, a smaller proportion of the discontinuous reinforcing fibers in the core layer may lead to reduced flexural modulus of the core layer as a whole. In contrast, where the proportion of the discontinuous reinforcing fibers is too large, a multilayer composite to be obtained would have a fewer number of intersections of the reinforcing fibers with the first thermoplastic resin, resulting in insufficient support for the intersections in the open cell structure and thus reduction in physical characteristics of the multilayer composite.

Skin Layer

It is important that a skin layer is configured as a composite including continuous reinforcing fibers and a second thermoplastic resin, in which the continuous reinforcing fibers arc impregnated with the second thermoplastic resin. Preferred forms of the continuous reinforcing fibers may include, for example, a woven fabric, a non-crimp fabric (NCF), a unidirectionally aligned material (UD material), and a knitted fabric. The continuous reinforcing fibers in these forms may be used singly or in combination of the continuous reinforcing fibers in two or more of the forms. Preferably, in order to enhance strength, the skin layer may have a fabric form in which the continuous reinforcing fibers are arranged at least one direction. For example, the skin layer may be a unidirectional woven fabric in which the continuous reinforcing fibers are arranged in one of the directions of warps and wefts, a bidirectional woven fabric in which the continuous reinforcing fibers are arranged in both of the directions of warps and wefts, a non-crimp fabric (NCF) in which the continuous reinforcing fibers are arranged as fiber strands in at least one direction, or a UD material in which the continuous reinforcing fibers are aligned in one direction.

The continuous reinforcing fibers may include: metal fibers, such as aluminum fiber, brass fiber, and stainless-steel fiber; glass fibers; carbon fibers, such as polyacrylonitrile-based, rayon-based, lignin-based, or pitch-based carbon fiber and graphite fiber; and inorganic fibers, such as silicon carbide fiber, silicon nitride fiber, alumina fiber, silicon carbide fiber, and boron fiber. These fibers may be used singly or in combination of two or more of the fibers. Among these fibers, a carbon fiber may preferably be used as it can impart high modulus and low specific gravity to a multilayer composite.

A second thermoplastic resin used in the skin layer is required to have a limiting oxygen index (LOI) of 30 or higher, preferably 32 or higher, and more preferably 35 or higher. Use of a second thermoplastic resin having an LOI that is too low is not preferred because it may reduce flame retardancy of the multilayer composite. A second thermoplastic resin used for the skin layer of the present invention may include, for example: a fluororesin, such as a polytetrafluoroethylene resin; a polyimide resin, such as a semi-aromatic polyimide resin, a polyamideimide resin, and a polyetherimide resin; a polysulfone resin, such as a polysulfone resin and a polyethersulfone resin; a semi-aromatic polyamide resin; a polyether ketone resin, such as a polyether ketone resin, a polyether ether ketone resin, and a polyether ketone ketone resin; a polycarbonate resin; a polyarylate resin; and a liquid crystal polyester resin, such as a wholly aromatic polyester resin. A flame retardant may be added to obtain a resin having an LOI that satisfies a predetermined range. Such a resin may include a general-purpose resin (for example, a polyester resin) containing a flame retardant. Of these resins, it is preferred to use a polyetherimide resin, a polyether ether ketone resin, a polyether ketone ketone resin, a polyethersulfone resin, a polycarbonate resin (preferably, a flame-retardant-containing polycarbonate resin), or a flame-retardant-containing polyester resin. These resins may be used singly or in combination of two or more of the resins. Forms of the second thermoplastic resin are not specifically limited, and the resin may have various forms, including a film, powder, and a nonwoven fabric.

As a method for producing the skin layer, the skin layer may be produced by a known process for producing a composite, with the continuous reinforcing fibers and the second thermoplastic resin. For example, a known process may be used, including heat pressing, hot melt, and resin impregnation using a solvent, or a combination thereof.

The continuous reinforcing fibers constituting the skin layer may be contained in a proportion from 40 to 80% by weight based on the total weight of the entire skin layer, preferably 45 to 75% by weight, and even more preferably 50 to 70% by weight. Where the proportion of the reinforcing fibers is too small, the resin accounts for a large proportion, possibly resulting in lower modulus. In contrast, where the proportion of the reinforcing fibers is too large, the fibers may partially be left unimpregnated, possibly reducing physical characteristics such as flexural strength and flexural modulus.

Multilayer Composite

According to the present invention, it is important that the multilayer composite has a multilayer structure and include at least one core layer and at least one skin layer. Additionally, in the multilayer composite of the present invention, it is important that the first and the second thermoplastic resins are mutually miscible in order to enhance adhesion between the skin layer and the core layer and to achieve lightweight and high flexural modulus of the multilayer composite.

In the present invention, the term "miscible" or the like means that two or more resins are capable of being mutually solubilized at a molecular level. In order to be miscible, the first thermoplastic resin and the second thermoplastic resin preferably have a small difference between their solubility parameters (hereinafter, sometimes referred to as SP value). Specifically, the solubility parameters may preferably have a difference $\Delta\delta$ $(J/cm^3)^{1/2}$ of 4 or smaller, more preferably 3 or smaller, even more preferably 2 or smaller, and most preferably 0.

It should be noted that the values of solubility parameters used in the present invention are determined in accordance with the method described in Polymer Handbook Fourth Edition Volume 2 (A John Wiley & Sons, Inc., Publication) J. BRANDRUP, E. H. IMMERGUT, and E. A. GRULKE (1999) pp. 675-714.

Even though any combination of the first thermoplastic resin and the second thermoplastic resin may be used as long as they are miscible, it is preferable that the first thermoplastic resin and the second thermoplastic resin are mutually the same kind of resins. Examples of combinations of miscible resins may include: a polyetherimide resin and a polycarbonate resin (preferably, a flame-retardant-containing polycarbonate resin); a polyetherimide resin and a polyether ether ketone resin; a polyether ether ketone resin and a polyether ketone ketone resin; and a polyetherimide resin and a flame-retardant-containing polyester resin.

The multilayer composite of the present invention is not particularly limited as to multilayer constitution (structure) of the skin layer and the core layer. The multilayer constitution of the skin layer and the core layer may suitably be selected to impart various properties to the multilayer composite. For example, a multilayer composite having high flexural strength and flexural modulus can be obtained by overlaying skin layers and a core layer in the order of "skin-core-skin" such that the skin layers having high strength and high modulus are arranged as the outermost layers which are subjected to highest load of flexural stress. Similarly, a multilayer composite having high heat insulating property can be obtained by overlaying layers in the order of "skin-core-skin-core-skin" such that a skin layer is inserted between the inner layers so as to suppress heat transfer due to convection of the air. Furthermore, a multilayer composite having sound absorbing property can be obtained by overlaying layers in the order of "skin-core" such that the core layer having an open cell structure is exposed on one surface.

In one aspect, the multilayer composite of the present invention can be obtained by a method of producing a multilayer composite, the method at least including: overlaying at least one core layer material and at least one skin layer material to form a multilayer stack; and heat-compressing the multilayer stack and then cooling so as to integrate the multilayer stack.

In the formation of the multilayer stack, the core layer material may be a nonwoven fabric that is formed of discontinuous reinforcing fibers and a first thermoplastic resin in a fibrous form and/or a particulate form, both the discontinuous reinforcing fibers and the first thermoplastic resin being randomly dispersed in the nonwoven fabric.

Additionally, in the formation of the multilayer stack, the skin layer material may be formed of a fabric made of continuous reinforcing fibers and a second thermoplastic resin to be impregnated in the fabric. The skin layer material may also be a pre-impregnated material in which the fabric has not been impregnated with the second thermoplastic resin yet or a composite prepreg in which the fabric is impregnated with the second thermoplastic resin.

In the integration of the skin layer and the core layer, the multilayer stack is compressed on faces that are perpendicular to the overlaying direction of the respective overlaid materials, while heating at a temperature above glass transition temperatures of the thermoplastic resins where they are amorphous resins, and/or at a temperature above melting points of the thermoplastic resins where they are crystalline resins, depending on the first and second resin species. In this way, it is possible to mutually solubilize the first and second thermoplastic resins as well as to bend the discontinuous reinforcing fibers in the core layer. Then, the first and second thermoplastic resins are cooled to a temperature below the glass transition temperatures and/or the melting points while maintaining the pressure, so that the resins in the core layer and the skin layer are bonded while bending is imparted to the discontinuous reinforcing fibers in the core layer so as to integrate the respective layers constituting the multilayer composite. For this purpose, the first and second thermoplastic resins are required to be miscible with each other. Preferably, the first and second thermoplastic resins may be identical to each other. If the first and second thermoplastic resins are not miscible with each other, separation may occur at a skin-core interface, making it impossible to achieve sufficient physical characteristics in the multilayer composite.

The integrated multilayer composite (or the un-expanded multilayer composite before subjecting to the heating and expanding procedures, which will be described later) includes the discontinuous reinforcing fibers having bending shape in the core layer. For example, in the present invention, the integrated multilayer composite may be used to be further expanded.

The integrated multilayer composite preferably has a void content from 0 to 20%, more preferably from 0 to 15%, and even more preferably from 0 to 10%. Where the integrated multilayer composite has a void content that is too high, the multilayer composite cannot be sufficiently heated to the inside thereof during heating in the expansion that will be described later, possibly preventing the core layer from uniformly expanding. In such a case, form-moldability of the multilayer composite achieved by thermal expansion may be deteriorated.

The present invention may further include a method for producing a multilayer composite, the method including further heating the multilayer composite obtained after the integration to release bending stress of the discontinuous reinforcing fibers so as to expand the multilayer composite. In a particularly preferable aspect, the multilayer composite can be form-molded by expansion.

As another aspect, the present invention may include a method for producing a multilayer composite, the method including heating the integrated multilayer composite (for example, the multilayer composite having bending discontinuous reinforcing fibers in core layer) to expand the multilayer composite. In a particularly preferable aspect, this method may also be used to form-mold the multilayer composite by expansion. Such a multilayer composite obtained after the integration may be, for example, the multilayer composite described in Aspect 8 above.

The multilayer composite in which the skin layer and the core layer are integrated by the above method is heated again to make the thermoplastic resins in the multilayer composite flowable so as to release the bending stress of the discontinuous reinforcing fibers in the core layer so that only the core layer may be selectively expanded in the multilayer composite. Where the multilayer composite is heated and then cooled to be solidified in any mold such that the multilayer composite is expanded in conformity with the selected mold, the multilayer composite can be form-molded so as to have an arbitrary shape and density. Since the multilayer composite of the present invention has high rigidity in the skin layer as an outer layer and low density in the core layer as an inner layer, the multilayer composite can achieve both lightweight and high physical characteristics. As a method for heating the multilayer composite, mention may be made of heating methods such as applying far-infrared, applying hot air, or contacting with a heating board.

In terms of lightweight and physical characteristics, in the expansion of the multilayer composite, the multilayer composite having a void content in a range from 0 to 20% (preferably from 0 to 15%, more preferably from 0 to 10%) is preferably heated such that the multilayer composite is expanded to have a higher void content after heating than the void content before heating (for example, the heated multilayer composite has a void content in a range from 20 to 80%).

The form-molded multilayer composite preferably has a void content in a range from 20 to 80%, more preferably from 25 to 80%, and even more preferably from 30 to 80%. Where the void content is too low, the obtained multilayer composite may not be sufficiently lightweight. In contrast, where the void content is too high, the form-molded multilayer composite may have insufficient physical characteristics.

It should be noted that in the form-molded multilayer composite, void contents of the core layer and the skin layer may separately be measured to determine the configuration of the multilayer composite. In that case, the form-molded multilayer composite may have a higher void content in the core layer than a void content in the skin layer. In order to achieve both lightweight and rigidity in the multilayer composite, for example, the core layer has a void content twice or more (for example, 2 to 20 times), preferably five times or more, and even more preferably ten times or more as high as the void content of the skin layer.

The void contents of the core layer and the skin layer can be determined by cutting the multilayer composite to obtain samples of a portion of the core layer only and a portion of the skin layer only, and then determining a void content of each of the cut portions.

A weight proportion (core proportion) of the core layer relative to the entire multilayer composite may preferably be from 20 to 75% by weight, more preferably from 22 to 73% by weight, and even more preferably from 24 to 70% by weight. Where the core proportion is too low, a sufficient expansion rate may not be achieved, causing a problem such as poor form-moldability. Where the core proportion is too high, there may be a problem of poor physical characteristics such as flexural strength and flexural modulus.

The multilayer composite as a whole may have a total basis weight from 100 to 8000 g/m$^2$, preferably from 500 to 7000 g/m$^2$, and more preferably from 800 to 6000 g/m$^2$.

The multilayer composite may also contain additives, such as an antioxidant, an antistatic agent, a radical inhibitor, a delustering agent, an ultraviolet absorption agent, a flame retardant, and various inorganic substances, as long as the advantages of the present invention are not deteriorated. Specific examples of such inorganic substances may include: carbon materials, such as carbon nanotube, fullerene, carbon black, graphite, and silicon carbide; silicate materials, such as talc, wollastonite, zeolite, sericite, mica, kaolin, clay, pyrophyllite, silica, bentonite, and alumina silicate; metal oxides, such as silicon oxide, magnesium oxide, alumina, zirconium oxide, titanium oxide, and iron oxide; carbonates, such as calcium carbonate, magnesium carbonate, and dolomite; sulfates, such as calcium sulfate and barium sulfate; hydroxides, such as calcium hydroxide, magnesium hydroxide, and aluminium hydroxide; glass, such as glass beads, glass flakes, and glass powder; ceramic beads; and boron nitride.

In order to achieve both lightweight and physical properties, the form-molded multilayer composite may preferably satisfies a flexural modulus of 10 GPa or higher and a specific flexural rigidity of 2.5 or higher, more preferably a flexural modulus of 11 GPa or higher and a specific flexural rigidity of 2.7 or higher, and even more preferably a flexural modulus of 12 GPa or higher and a specific flexural rigidity of 3 or higher. Where the flexural modulus is too low, the multilayer composite may have insufficient physical characteristics to be used for interior components in aircrafts and/or railway cars, for example.

The form-molded multilayer composite may preferably have a flexural strength of 100 MPa or higher, more preferably 110 MPa or higher, and even more preferably 120 MPa or higher. Where the flexural strength is too low, the multilayer composite may have insufficient physical characteristics to be used for interior components in aircrafts and/or railway cars, for example.

The multilayer composite may preferably have a flame spread index (Is) of 35 or lower in a flame spread measurement in accordance with ASTM-E162, more preferably 20 or lower, and even more preferably 10 or lower. Where Is is too high, the multilayer composite may be easily flammable in case of fire, and thus have insufficient flame retardancy to be used for interior components in aircrafts and/or railway cars.

The multilayer composite may preferably have an optical density Ds(4.0) of smoke after 4 minutes of 200 or lower in a smoke density measurement in accordance with ASTM-E662, more preferably 100 or lower, and even more preferably 50 or lower. Where Ds(4.0) is too high, the combusted multilayer composite may generate a large amount of smoke so that it may have deteriorated smoking property in combustion when it is used for interior components in aircrafts and/or railway cars.

Applications of the above-described multilayer composite may include, but is not limited to side wall panels and ceiling panels of infrastructure, aircrafts and trains, cargo ships, office partitions, backing and ceiling tiles of elevator shafts, embedded housings for lighting equipment, and any other applications that are currently produced by using a honeycomb sandwich structure, a thermoplastic plastic sheet, and FRP (fiber reinforced plastic). The multilayer composite can be molded or formed into various products by a known method in the art, including, pressure molding, thermoforming, heat pressing, vacuum forming, compression molding, and autoclave molding, for example.

EXAMPLES

Hereinafter, the multilayer composite of the present invention will be further described in detail with reference to Examples below, which are not to be construed as limiting the scope of the present invention.

Specific Gravity of Multilayer Composite

A multilayer composite was cut into strips of 1 cm×10 cm, and determined a specific gravity of the multilayer composite from a thickness and a weight of each strip by the following formula. An average of 10 strips was obtained.

Specific gravity=$(m \times 10)/(1 \times 10 \times h)$

In this formula, m denotes a weight (g) of the multilayer composite, and h denotes a thickness (mm) of the multilayer composite.

Void Content

In accordance with JIS K 7075, a fiber weight content of a multilayer composite was determined by a combustion method. A void content of the multilayer composite was determined from the fiber weight content and a specific gravity of the multilayer composite.

It should be noted that in the case where void contents of the core layer and the skin layer were separately determined, samples of the core layer and the skin layer were randomly obtained from the multilayer composite, and the void contents of the respective samples were determined in accordance with the above-described method.

Maximum Void Content

A maximum void content shows a maximum void content of a fully expanded multilayer composite when the preform-molded multilayer composite is heated without applying load. A maximum void content was determined by heating a pre-form-molded multilayer composite for 5 minutes in a hot air furnace set to a form-molding temperature defined below, and then measuring a void content of the multilayer composite. The form-molding temperature was defined to be (a glass transition temperature of a thermoplastic resin+30)° C. in the case where the thermoplastic resin is an amorphous resin, or to be (a melting point of a thermoplastic resin+10)° C. in the case where the thermoplastic resin is a crystalline resin.

Flexural Strength and Modulus

Flexural strength (σ) and modulus (E) were evaluated in accordance with JIS K 7017 (Method A, Class I test piece).

Specific Flexural Strength and Specific Flexural Rigidity

A specific flexural strength and a specific flexural rigidity of a multilayer composite were determined by the following formulae.

Specific flexural strength: $\sigma^{1/2}/\rho$

Specific flexural rigidity: $E^{1/3}/\rho$

In the formulae, σ denotes a flexural strength (MPa), E denotes a flexural modulus (GPa), and ρ denotes a specific gravity of the multilayer composite.

Combustion Spread Property

A combustion spread property of a multilayer composite was evaluated in accordance with ASTM-E162 to determine a flame spread index (Is).

Smoke Density

A smoke density was evaluated in accordance with ASTM-E662 to determine an optical density Ds(4.0) of smoke after 4 minutes.

Degree of Crystallinity of Polyester Polymer

A degree of crystallinity of a polyester binder fiber was determined by wide-angle x-ray diffraction. That is, a scattering intensity at [010] surface was measured using an X-ray generator (RAD-3A) produced by Rigaku Cooperation, with a Cu-Kα ray monochromated with a nickel filter. A degree of crystallinity was calculated by the following formula.

(Degree of crystallinity Xc)=(scattering intensity in the crystallized portion)/(total scattering intensity)×100(%)

Intrinsic Viscosity of Polyester Polymer

An intrinsic viscosity of a polyester binder fiber was determined by dissolving the polyester binder fiber in a mixed solution of phenol/chloroethane (weight ratio of 1/1) and measuring a viscosity of the solution at 30° C.

Observation of Cross Section of Core Layer

Observation of a cross section of a core layer was performed by cutting an obtained multilayer composite and observing the cut surface using a scanning electron microscope (JSM-5300 produced by JEOL).

Reference Example 1 (Production of Polyetherimide Fiber)

A polyetherimide (hereinafter, sometimes abbreviated as PEI) polymer ("ULTEM 9001" manufactured by SABIC Innovative Plastics Holding), which was an amorphous resin, was dried under vacuum at 150° C. for 12 hours. The PEI polymer was discharged from nozzles having round holes, under the condition of a spinning head temperature of 390° C., a spinning speed of 1500 m/min, and a discharge rate of 50 g/min to obtain multi-filaments (2640 dtex/1200 f) of PEI. The thus-obtained multi-filaments were cut to a length of 15 mm to obtain short cut PEI fibers. The obtained short cut fibers had good appearance without fuzzing, and had an average single fiber fineness of 2.2 dtex and an average single fiber length of 15.0 mm.

Besides the short cut PEI fibers having the fiber length of 15.0 mm, in order to obtain staple PEI fibers, the obtained multi-filaments were crimped and then cut to a length of 51 mm. The obtained staple fibers had good appearance without fuzzing, and had an average single fiber fineness of 2.2 dtex and an average single fiber length of 51.1 mm.

Reference Example 2 (Production of Polyether Ether Ketone Fiber)

A polyether ether ketone (hereinafter, sometimes abbreviated as PEEK) polymer ("90G" manufactured by Victrex plc) was dried under vacuum at 80° C. for 12 hours. The PEEK polymer was discharged from nozzles having round holes, under the condition of a spinning head temperature of 400° C., a spinning speed of 1500 m/min, and a discharge rate of 50 g/min to obtain multi-filaments. The thus-obtained multi-filaments were cut to a length of 15 mm to obtain short cut PEEK fibers. The obtained fibers had good appearance without fuzzing, and had an average single fiber fineness of 8.8 dtex and an average single fiber length of 15.1 mm.

In addition, the obtained multi-filaments were crimped and then cut to a length of 51 mm to obtain staple PEEK fibers. The obtained fibers had good appearance without fuzzing, and had an average single fiber fineness of 8.8 dtex and an average single fiber length of 51.0 mm.

Reference Example 3 (Production of Flame-Retardant Polycarbonate Fiber)

A flame-retardant-containing polycarbonate polymer ("LEXAN FST9705" manufactured by SABIC Innovative Plastics Holding; hereinafter, sometimes abbreviated as PC(FR)) was dried under vacuum at 105° C. for 12 hours. The PC(FR) polymer was discharged from nozzles having round holes, under the condition of a spinning head temperature of 310° C., a spinning speed of 1500 m/min, and a discharge rate of 50 g/min to obtain multi-filaments (2640 dtex/1200 f) of the PC(FR) fiber. The thus-obtained multi-filaments were crimped and then cut to a length of 51 mm to obtain staple PC(FR) fibers. The obtained fibers had good appearance without fuzzing, and had an average single fiber fineness of 2.2 dtex and an average single fiber length of 51.0 mm.

Reference Example 4 (Production of Flame-Retardant Polyamide 66 Fiber)

A flame-retardant-containing polyamide 66 polymer ("Leona FR370" manufactured by Asahi Kasei Cooperation; hereinafter, sometimes abbreviated as PA66(FR)) was dried under vacuum at 80° C. for 12 hours. The semi-aromatic polyamide polymer was discharged from nozzles having round holes, under the condition of a spinning head temperature of 310° C., a spinning speed of 1500 m/min, and a discharge rate of 50 g/min to obtain multi-filaments of the PA66(FR) fiber. The thus-obtained multi-filaments were crimped and then cut to a length of 51 mm to obtain staple PA66(FR) fibers. The obtained fibers had good appearance without fuzzing, and had an average single fiber fineness of 0.7 dtex and an average single fiber length of 51.0 mm.

Reference Example 5 (Production of Polycarbonate/Polybutylene Terephthalate Fiber)

Mixture of 67% by weight of a polycarbonate polymer ("LEXAN121R" manufactured by SABIC Innovative Plastics Holding) and 33% by weight of a polybutylene terephthalate polymer ("VALOX325" manufactured by SABIC Innovative Plastics Holding) was dried under vacuum at 120° C. for 4 hours. The polymer mixture was discharged from nozzles having round holes, under the condition of a spinning head temperature of 280° C., a spinning speed of 1500 m/min, and a discharge rate of 50 g/min to obtain multi-filaments of the polycarbonate/polybutylene terephthalate (hereinafter, sometimes abbreviated as PC-PBT) fiber. The thus-obtained multi-filaments were cut to a length of 15 mm to obtain short cut PC-PBT fibers. The obtained fibers had good appearance without fuzzing, and had an average single fiber fineness of 2.2 dtex and an average single fiber length of 15.1 mm.

In addition, the obtained multi-filaments were crimped and then cut to a length of 51 mm to obtain staple PC-PBT fibers. The obtained fibers had good appearance without fuzzing, and had an average single fiber fineness of 2.2 dtex and an average single fiber length of 51.0 mm.

Reference Example 6 (Production of PET Binder Fiber)

A polymerization reaction was carried out at 280° C. using a polymerization reactor in accordance with an ordinary method to produce a PET (polyethylene terephthalate) polymer containing 100 mol % ethylene glycol as a diol component, and terephthalic acid and isophthalic acid at a copolymerization ratio (molar ratio) of 70/30 as dicarboxylic acid components and having an intrinsic viscosity (η) of 0.81. The produced polymer was extruded from the bottom of the polymerization reactor into water to form strands, and then cut into pellets. The thus-obtained PET polymer was supplied to a vent-type corotating twin-screw extruder heated to 270° C., and retained for 2 min. The PET polymer was then directed to a spinning head heated to 280° C., discharged from nozzles having round holes, under the condition of a discharge rate of 45 g/min, and wound at a spinning speed of 1200 m/min to obtain multi-filaments (2640 dtex/1200 f) of the PET polymer. Then, the obtained fibers were cut into a length of 15 mm.

The obtained fibers had good appearance without fuzzing, and had an average single fiber fineness of 2.2 dtex, an average single fiber length of 10.0 mm, a degree of crystallinity of 20%, and an intrinsic viscosity of 0.8. The fibers had a circular cross section.

Example 1

Skin Layer

A skin layer was prepared by overlaying nonwoven fabrics made of PEI fibers on both sides of a woven carbon fiber fabric ("W-3101" manufactured by Toho Tenax Co., Ltd.) having a basis weight of 200 g/m². Each of the nonwoven fabrics made of the PEI fibers was obtained by needle punching of the PEI staple fibers cut into a length of 51 mm to form a PEI nonwoven fabric having a basis weight of 100 g/m², a thickness of 0.5 mm, and a bulk density of 0.2 g/cm³.

Core Layer

A core layer was prepared by obtaining a nonwoven fabric in a form of a mixed paper having a basis weight of 100 g/m² by a wetlaid process from a slurry containing 52% by weight of the PEI fibers cut into a length of 15 mm; 43% by weight of chopped carbon fiber strands cut into a length of 12.7 mm (average fiber diameter of 7 μm), manufactured by Toho Tenax Co., Ltd.; and 5% by weight of the PET binder fibers cut into a length of 15 mm. The thus-obtained nonwoven fabrics were overlaid with each other.

Multilayer Composite

A multilayer stack was prepared by arranging a single skin layer on each of the opposite sides of a core layer without bonding these layers. The multilayer stack was heated to 380° C. using a heat press machine with a pressure of 15 MPa applied to the surfaces perpendicular to the overlaying direction so as to melt the PEI resin in the skin layers and the core layer and subject the PEI resin to be impregnated between the continuous reinforcing fibers in each of the skin layers as well as between the discontinuous reinforcing fibers in the core layer. Then, the multilayer stack was cooled to 200° C., which is a temperature lower than the glass transition temperature of the PEI, while maintaining the pressure to obtain a multilayer composite in which the skin layers and the core layer were integrated. The obtained multilayer composite had a thickness of 1.2 mm, a specific gravity of 1.48, a total basis weight of 1800 g/m², a core proportion of 56%, and a void content of 0%.

Figure 2:
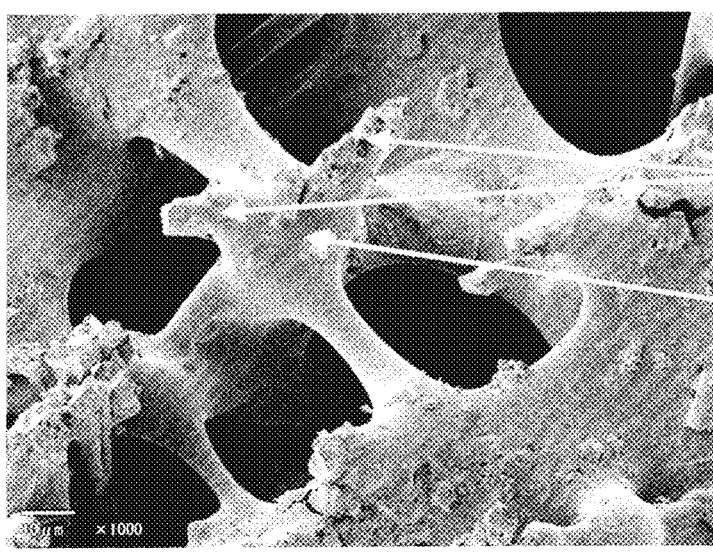
FIG. 2 is an enlarged SEM image of a core layer in a multilayer composite prepared in Example 1.

The thus-obtained multilayer composite was heated at 300° C. for 1 min by a test pressing machine having a clearance between press surfaces adjusted to 2.7 mm to form-mold the multilayer composite by expansion. The form-molded multilayer composite had a thickness of 2.7 mm, a void content of 54%, and a specific gravity of 0.96. Additionally, scanning electron microscope (SEM) images (FIGS. 1 and 2) of the cross section of the core layer were taken to confirm that the nonwoven fabrics of the core layer were made of the randomly-dispersed discontinuous reinforcing fibers and had intersections bonded with the thermoplastic resin. The form-molded multilayer composite had a flexural strength of 130 MPa, a flexural modulus of 13.0 GPa, and a specific flexural rigidity of 3.9, and thus was excellent in physical characteristics. Also, the multilayer composite had a flame spread index Is of 1 and a smoke density Ds(4.0) of 0.3, and thus was excellent both in flame retardancy and low smoking property. Furthermore, the multilayer composite had a maximum void content of 77%, showing excellent expansivity.

Example 2

A multilayer composite was prepared in the same manner as that of Example 1, except for arranging two skin layers on each of the opposite sides of a core layer of a multilayer stack. The obtained multilayer composite had a thickness of 1.8 mm, a specific gravity of 1.49, a total basis weight of 2600 g/m², a core proportion of 38%, and a void content of 0%. The obtained multilayer composite was heated at 300° C. for 1 min by a test pressing machine having a clearance between press surfaces adjusted to 3.9 mm to form-mold the multilayer composite by expansion. The form-molded multilayer composite had a thickness of 3.9 mm, a void content of 55%, and a specific gravity of 0.96. The form-molded multilayer composite had a flexural strength of 150 MPa, a flexural modulus of 15.2 GPa, and a specific flexural rigidity of 3.7, and thus was excellent in physical characteristics. Also, the multilayer composite had a flame spread index Is of 1 and a smoke density Ds(4.0) of 0.2, and thus was excellent both in flame retardancy and low smoking property. Furthermore, the multilayer composite had a maximum void content of 67%, showing excellent expansivity.

Example 3

A multilayer composite was prepared in the same manner as that of Example 1, except for arranging three skin layers on each of the opposite sides of a core layer of a multilayer stack. The obtained multilayer composite had a thickness of 2.3 mm, a specific gravity of 1.49, a total basis weight of 3400 g/m², a core proportion of 29%, and a void content of 0%. The obtained multilayer composite was heated at 300° C. for 1 min by a test pressing machine having a clearance between press surfaces adjusted to 5.1 mm to form-mold the multilayer composite by expansion. The form-molded multilayer composite had a thickness of 5.1 mm, a void content of 55%, and a specific gravity of 0.96. The form-molded multilayer composite had a flexural strength of 165 MPa, a flexural modulus of 14.0 GPa, and a specific flexural rigidity of 3.6, and thus was excellent in physical characteristics. Also, the multilayer composite had a flame spread index Is of 1 and a smoke density Ds(4.0) of 0.1, and thus was excellent both in flame retardancy and low smoking property. Furthermore, the multilayer composite had a maximum void content of 58%, showing excellent expansivity.

Example 4

A multilayer composite was prepared in the same manner as that of Example 1, except for arranging four skin layers on each of the opposite sides of a core layer of a multilayer stack. The obtained multilayer composite had a thickness of 2.8 mm, a specific gravity of 1.49, a total basis weight of 4200 g/m², a core proportion of 24%, and a void content of 0%. The obtained multilayer composite was heated at 300° C. for 1 min by a test pressing machine having a clearance between press surfaces adjusted to 6.2 mm to form-mold the multilayer composite by expansion. The form-molded multilayer composite did not expand to the set clearance and had a thickness of 4.7 mm. The multilayer composite had a void content of 40% and a specific gravity of 1.06. The form-molded multilayer composite had a flexural strength of 300 MPa, a flexural modulus of 31.3 GPa, and a specific flexural rigidity of 3.5, and thus was excellent in physical characteristics. Also, the multilayer composite had a flame spread index Is of 1 and a smoke density Ds(4.0) of 0.1, and thus was excellent both in flame retardancy and low smoking property. Furthermore, the multilayer composite had a maximum void content of 40%, showing excellent expansivity.

Example 5

A multilayer composite was prepared in the same manner as that of Example 2, except for using, instead of the PEI fiber, a polyether ether ketone (PEEK) fiber in nonwoven fabrics constituting skin layers and a nonwoven fabric constituting a core layer. The multilayer composite in which the skin layers and the core layer were integrated had a thickness of 1.71 mm, a specific gravity of 1.52, a total basis weight of 2600 g/m$^2$, a core proportion of 38%, and a void content of 0%. The obtained multilayer composite was heated at 370° C. for 1 min by a test pressing machine having a clearance between press surfaces adjusted to 3.8 mm to form-mold the multilayer composite by expansion. The form-molded multilayer composite had a thickness of 3.8 mm, a void content of 55%, and a specific gravity of 0.98. The form-molded multilayer composite had a flexural strength of 150 MPa, a flexural modulus of 15.2 GPa, and a specific flexural rigidity of 3.7, and thus was excellent in physical characteristics. Also, the multilayer composite had a flame spread index Is of 1 and a smoke density Ds(4.0) of 0.3, and thus was excellent both in flame retardancy and low smoking property. Furthermore, the multilayer composite had a maximum void content of 68%, showing excellent expansivity.

Example 6

A multilayer composite was prepared in the same manner as that of Example 2, except for using a PC(FR) fiber in nonwoven fabrics constituting skin layers and a PEI fiber in a nonwoven fabric constituting a core layer The multilayer composite in which the skin layers and the core layer were integrated had a thickness of 1.7 mm, a specific gravity of 1.49, a total basis weight of 2600 g/m$^2$, a core proportion of 39%, and void content of 0%. The obtained multilayer composite was heated at 300° C. for 1 min by a test pressing machine having a clearance between press surfaces adjusted to 3.8 mm to form-mold the multilayer composite by expansion. The form-molded multilayer composite had a thickness of 3.8 mm, a void content of 55%, and a specific gravity of 0.96. The form-molded multilayer composite had a flexural strength of 140 MPa, a flexural modulus of 14.8 GPa, and a specific flexural rigidity of 3.7, and thus was excellent in physical characteristics. Also, the multilayer composite had a flame spread index Is of 1 and a smoke density Ds(4.0) of 1.8, and thus was excellent both in flame retardancy and low smoking property. Furthermore, the multilayer composite had a maximum void content of 67%, showing excellent expansivity.

Comparative Example 1

A multilayer stack was prepared by overlaying eight skin layers prepared in accordance with Example 1, without providing a core layer. The multilayer stack was heated to 380° C. using a heat press machine with a pressure of 10 MPa applied to the surfaces perpendicular to the overlaying direction so as to melt the PEI resin in the skin layers. Then, the multilayer stack was cooled to 200° C., which is a temperature lower than the glass transition temperature of the PEI, while maintaining the pressure to obtain a composite in which the eight skin layers were integrated. The obtained composite had a thickness of 2.1 mm, a specific gravity of 1.50, a total basis weight of 3200 g/m$^2$, and a void content of 0%. The obtained composite had a flame spread index Is of 1 and a smoke density Ds(4.0) of 0.1, and thus was excellent both in flame retardancy and low smoking property. Although the composite had a flexural strength of 904 MPa and a flexural modulus of 47.9 GPa, it had a specific flexural rigidity of 2.4, indicating that the composite had poor physical characteristics. Furthermore, the obtained composite had a maximum void content of 5%, showing poor expansivity.

Comparative Example 2

A multilayer stack was prepared by overlaying 27 core layers prepared in accordance with Example 1, without providing a skin layer. The multilayer stack was heated to 340° C. using a heat press machine with a pressure of 15 MPa applied to the surfaces perpendicular to the overlaying direction so as to melt the PEI resin in the core layer. Then, the multilayer stack was cooled to 200° C., which is a temperature lower than the glass transition temperature of the PEI, while maintaining the pressure to obtain a composite in which the 27 core layers were integrated. The obtained composite had a thickness of 1.8 mm, a specific gravity of 1.47, a total basis weight of 2700 g/m$^2$, and a void content of 0%. The composite was heated at 300° C. for 1 min by a test pressing machine having a clearance between press surfaces adjusted to 4.0 mm to form-mold the composite by expansion. The form-molded composite had a thickness of 4.0 mm, a void content of 55%, and a specific gravity of 0.95. The form-molded composite had a flame spread index Is of 1 and a smoke density Ds(4.0) of 0.5, and thus was excellent both in flame retardancy and low smoking property. Also, the composite had a maximum void content of 85%, showing excellent expansivity. Although the composite had a flexural strength of 118 MPa and a specific flexural rigidity of 3.1, it had a flexural modulus of 9.3 GPa, showing poor physical characteristics.

Comparative Example 3

A multilayer composite was prepared in the same manner as that of Example 2, except for using, instead of the PEI fiber, a PA66(FR) fiber in nonwoven fabrics constituting skin layers. The obtained multilayer composite had a thickness of 1.8 mm, a specific gravity of 1.43, a total basis weight of 2600 g/m$^2$, a core proportion of 38% and a void content of 0%. The multilayer composite was heated at 300° C. for 1 min by a test pressing machine having a clearance between press surfaces adjusted to 4.1 mm to form-mold the multilayer composite by expansion. The obtained multilayer composite had poor miscibility between the skin layers and the core layer, and thus showed white spots due to separation the skin layers from the core layer. The form-molded multilayer composite had a thickness of 3.9 mm, a void content of 54%, and a specific gravity of 0.92. The form-molded multilayer composite had a maximum void content of 71%, showing excellent expansivity. Although the multilayer composite had a flexural modulus of 14.3 GPa and a specific flexural rigidity of 3.6, it had a flexural strength of 95 MPa, showing poor physical characteristics.

Comparative Example 4

A multilayer composite was prepared in the same manner as that of Example 2, except for using, instead of the PEI fiber, a PC-PBT fiber in nonwoven fabrics constituting skin layers and a nonwoven fabric constituting a core layer. The obtained multilayer composite had a thickness of 1.8 mm, a specific gravity of 1.46, a total basis weight of 2600 g/m$^2$, a core proportion of 38%, and a void content of 0%. The multilayer composite was heated at 300° C. for 1 min by a test pressing machine having a clearance between press surfaces adjusted to 4.0 mm to form-mold the multilayer composite by expansion. The form-molded multilayer composite had a thickness of 4.0 mm, a void content of 55%, and a specific gravity of 0.94. The form-molded multilayer composite had a flexural strength of 150 MPa, a flexural modulus of 15.2 GPa, and a specific flexural rigidity of 3.7, thus was excellent in physical characteristics. In addition, the multilayer composite had a smoke density Ds(4.0) of 79 and a maximum void content of 66%, indicating that the multilayer composite was excellent in low smoking property and expansivity. However, the multilayer composite had a flame spread index Is of 69, showing poor flame retardancy.

following conditions (A) to (D) are excellent in flame retardancy and low smoking property, excellent in integrity, and have high physical characteristics. Furthermore, it is shown that such multilayer composites are easily adjustable in shape and density by thermal expansion molding and are excellent in form-moldability.

(A) the core layer is a composite including discontinuous reinforcing fibers and a first thermoplastic resin, in which the

TABLE 1

| | Core layer | | | | | Skin layer | | | | | Multilayer composite | | |
|---|---|---|---|---|---|---|---|---|---|---|---|---|---|
| | | Discont. | Thermoplastic resin | | | Cont. | | Thermoplastic resin | | | Multilayer constitution | Core | Total basis |
| | Configuration | reinforcing fiber | Polymer | LOI | SP value | Configuration | reinforcing fiber | Polymer | LOI | SP value | Skin/core/skin | prop. (wt %) | weight (g/m³) |
| Ex. 1 | Nonwoven fabric | CF | PEI | 47 | 22.5 | Woven fabric | CF | PEI | 47 | 22.5 | 1/1/1 | 56 | 1800 |
| Ex. 2 | Nonwoven fabric | CF | PEI | 47 | 22.5 | Woven fabric | CF | PEI | 47 | 22.5 | 2/1/2 | 38 | 2600 |
| Ex 3 | Nonwoven fabric | CF | PEI | 47 | 22.5 | Woven fabric | CF | PEI | 47 | 22.5 | 3/1/3 | 29 | 3400 |
| Ex. 4 | Nonwoven fabric | CF | PEI | 47 | 22.5 | Woven fabric | CF | PEI | 47 | 22.5 | 4/1/4 | 24 | 4200 |
| Ex. 5 | Nonwoven fabric | CF | PEEK | 35 | 26.1 | Woven fabric | CF | PEEK | 35 | 26.1 | 2/1/2 | 38 | 2600 |
| Ex. 6 | Nonwoven fabric | CF | PEI | 47 | 22.5 | Woven fabric | CF | PC(FR) | 36 | 19.6 | 2/1/2 | 39 | 2600 |
| Com. Ex. 1 | — | — | — | — | — | Woven fabric | CF | PEI | 47 | 22.5 | Skin only | 0 | 3200 |
| Com. Ex. 2 | Nonwoven fabric | CF | PEI | 47 | 22.5 | — | — | — | — | — | Core only | 100 | 2700 |
| Com. Ex. 3 | Nonwoven fabric | CF | PEI | 47 | 22.5 | Woven fabric | CF | PA66(FR) | 36 | 27.8 | 2/1/2 | 38 | 2600 |
| Com. Ex. 4 | Nonwoven fabric | CF | PC-PBT | 23 | — | Woven fabric | CF | PC-PBT | 23 | — | 2/1/2 | 38 | 2600 |

| | Multilayer composite | | | Form-moldability | | | | | Physical characteristics | | | Flame retardancy Is | Low smoking property Ds(4.0) |
|---|---|---|---|---|---|---|---|---|---|---|---|---|---|
| | Prop. of reinforcing fiber (%) | Theoretical density (g/cm³) | Density (g/cm³) | Void content before form-molding (%) | Void content after form-molding (%) | | | Ratio of core/skin void contents (time) | Max. void content (%) | Flexural strength (MPa) | Flexural modulus (GPa) | Specific flexural rigidity | | |
| | | | | | Core layer | Skin layer | Whole | | | | | | | |
| Ex. 1 | 46.1 | 1.476 | 1.48 | 0 | 68 | 4 | 54 | 17 | 77 | 130 | 13.0 | 3.9 | 1 | 0.3 |
| Ex. 2 | 47.3 | 1.482 | 1.49 | 0 | 76 | 4 | 55 | 19 | 67 | 150 | 15.2 | 3.7 | 1 | 0.2 |
| Ex 3 | 48.0 | 1.485 | 1.49 | 0 | 80 | 5 | 55 | 16 | 58 | 165 | 14.0 | 3.6 | 1 | 0.1 |
| Ex. 4 | 48.3 | 1.487 | 1.49 | 0 | 83 | 5 | 40 | 17 | 40 | 300 | 31.3 | 3.5 | 1 | 0.1 |
| Ex. 5 | 47.3 | 1.503 | 1.52 | 0 | 75 | 5 | 55 | 15 | 68 | 150 | 15.2 | 3.7 | 1 | 0.3 |
| Ex. 6 | 47.3 | 1.480 | 1.49 | 0 | 76 | 4 | 55 | 19 | 67 | 140 | 14.8 | 3.7 | 1 | 1.8 |
| Com. Ex. 1 | 50.0 | 1.496 | 1.5 | 0 | — | 5 | 3 | — | 5 | 904 | 47.9 | 2.4 | 1 | 0.1 |
| Com. Ex. 2 | 43.0 | 1.460 | 1.47 | 0 | 55 | — | 55 | — | 85 | 118 | 9.3 | 3.1 | 1 | 0.5 |
| Com. Ex. 3 | 47.3 | 1.430 | 1.43 | 0 | 77 | 4 | 54 | 19 | 71 | 95 | 14.3 | 3.6 | — | — |
| Com. Ex. 4 | 47.3 | 1.460 | 1.46 | 0 | 76 | 4 | 55 | 19 | 66 | 150 | 15.2 | 3.7 | 69 | 79 |

In Table 1, PEI denotes a polyetherimide polymer, PEEK denotes a polyether ether ketone polymer, PC(FR) denotes a flame-retardant-containing polycarbonate polymer, PA66 (FR) denotes a flame-retardant-containing polyamide 66 polymer, PC-PBT denotes a mixed polymer of a polycarbonate polymer and a polybutylene terephthalate polymer, and CF denotes carbon fiber.

As evident from Table 1, the multilayer composites each having a multilayer structure and including at least one core layer and at least one skin layer, as well as satisfying all the following conditions (A) to (D) are excellent in flame retardancy and low smoking property, excellent in integrity, and have high physical characteristics. Furthermore, it is shown that such multilayer composites are easily adjustable in shape and density by thermal expansion molding and are excellent in form-moldability.

(A) the core layer is a composite including discontinuous reinforcing fibers and a first thermoplastic resin, in which the discontinuous reinforcing fibers are randomly dispersed and bonded with the first thefinoplastic resin at least at intersections of the discontinuous reinforcing fibers;

(B) the skin layer is a composite including continuous reinforcing fibers and a second thermoplastic resin, in which the continuous reinforcing fibers are impregnated with the second thermoplastic resin;

(C) each of the first and the second thermoplastic resins has a limiting oxygen index of 30 or higher; and (D) the first and the second thermoplastic resins are miscible with each other.

INDUSTRIAL APPLICABILITY

The multilayer composite according to the present invention is excellent in flame retardancy and low smoking property, is easily adjustable in shape and density by thermal expansion molding, is excellent in form-moldability, and also has high physical characteristics. Hence, the multilayer composited may suitably be used for side wall panels and ceiling panels of infrastructure, aircrafts, railway cars, cargo ships, and thus have applicability.

Although the present invention has been described in connection with the preferred embodiments thereof with reference to the accompanying drawings, those skilled in the art will readily conceive numerous changes and modifications within the framework of obviousness upon the reading of the specification presented herein. Accordingly, such changes and modifications are construed as within the scope of the invention as defined by the scope of the claims.

What is claimed is:

1. A multilayer composite having a multilayer structure and comprising at least one core layer and at least one skin layer, wherein the multilayer composite satisfies all the following conditions (A) to (D):
   (A) the core layer is a composite comprising discontinuous reinforcing fibers, a first thermoplastic resin, and a polymer binder which is different from the first thermoplastic resin, in which the discontinuous reinforcing fibers are randomly dispersed and bonded with the first thermoplastic resin at least at intersections of the discontinuous reinforcing fibers;
   (B) the skin layer is a composite comprising continuous reinforcing fibers and a second thermoplastic resin, in which the continuous reinforcing fibers are impregnated with the second thermoplastic resin;
   (C) each of the first and the second thermoplastic resins has a limiting oxygen index of 30 or higher; and
   (D) the first and the second thermoplastic resins are miscible with each other and are mutually solubilized in one another.

2. The multilayer composite according to claim 1, wherein the continuous reinforcing fibers constituting the skin layer are carbon fibers.

3. The multilayer composite according to claim 1, wherein each of the first and the second thermoplastic resins is at least one resin selected from the group consisting of a polyetherimide resin, a polyether ether ketone resin, a polyether ketone ketone resin, a poivethersulfone resin, a thermoplastic polyimide resin, a flame-retardant-containing polycarbonate resin, and a flame-retardant-containing polyester resin.

4. The multilayer composite according to claim 1, wherein the first and the second thermoplastic resins are identical.

5. The multilayer composite according to claim 1, wherein the multilayer composite has a void content in a range from 20 to 80%.

6. The multilayer composite according to claim 1, wherein the core layer has a void content twice or more as high as that of the skin layer.

7. The multilayer composite according to claim 1, wherein the discontinuous reinforcing fibers in the core layer have a bending shape and are used to expand the multilayer composite.

8. A method for producing the multilayer composite according to claim 1, the method comprising:
   overlaying the at least one core layer material and the at least one skin layer material to form a multilayer stack, and
   heat-compressing the multilayer stack and then cooling so as to integrate the multilayer stack, wherein
   in the formation of the multilayer stack,
   the core layer material is a nonwoven fabric that is formed of the discontinuous reinforcing fibers, the first thermoplastic resin and the polymer binder which is different from the first thermoplastic resin in a fibrous form and/or a particulate form, both the discontinuous reinforcing fibers and the first thermoplastic resin being randomly dispersed in the nonwoven fabric,
   the skin layer material is formed of a fabric made of the continuous reinforcing fibers and the second thermoplastic resin to be impregnated in the fabric
   in the integration of the multilayer stack, and
   heating-compressing is carried out to mutually solubilize the first thermoplastic resin and the second thermoplastic resin and to bend the discontinuous reinforcing fibers.

9. The method for producing a multilayer composite according to claim 8, further comprising heating the multilayer composite obtained after the integration to release bending stress of the discontinuous reinforcing fibers so as to expand the multilayer composite.

10. The method according to claim 9, wherein in the expansion of the multilayer composite, the multilayer composite having a void content in a range from 0 to 20% is heated such that the multilayer composite is expanded to have a higher void content after heating than the void content before heating.

11. The method according to claim 10, wherein the void content of the multilayer composite after heating is in a range from 20 to 80%.

12. The method according to claim 9, wherein the heating of the multilayer composite comprises form-molding.

13. The multilayer composite according to claim 1, wherein a difference in solubility parameter between the first thermoplastic resin and the second thermoplastic resin $\Delta\delta(J/cm^3)^{1/2}$ determined in accordance with the method described in Polymer Handbook Fourth .Edition Volume 2 (A John Wiley & Sons, Inc., Publication) J. BRANDRUP, E. H. IMMERGUT, and E. A. GRULKE, (1999) pp.675-714 is from 0 to 4.

14. The multilayer composite according to claim 1, wherein a weight ratio of a total amount of the first thermoplastic resin and the discontinuous reinforcing fibers to the polymer binder in the core layer is from 85/15 to 99/1.

* * * * *